UNITED STATES PATENT OFFICE

WALLACE L. CHANDLER, OF EAST LANSING, MICHIGAN, ASSIGNOR, BY MESNE ASSIGNMENTS, TO MERCK & CO. INC., OF RAHWAY, NEW JERSEY, A CORPORATION OF NEW JERSEY

COLLOIDAL IODINE AND THE PROCESS OF MAKING THE SAME

No Drawing. Application filed November 21, 1925. Serial No. 70,697.

The object of this invention is to produce a form or state of pure free iodine which is more active and more readily available for use as a disinfectant and for medical and surgical purposes than any of the known iodine preparations containing free, uncombined iodine.

Sublimed iodine crystals are but slowly soluble, are corrosive and not well suited for use as a disinfectant or for medical and surgical purposes. Free iodine in solution in the various solvents of iodine is held in solution by virtue of the properties of the solvents and is thus not readily available for use as a disinfectant or for medical or surgical purposes. Furthermore, iodine in solution in iodides when applied to the skin is held on the surface of the skin by the iodides; and as the iodide solution becomes more concentrated through the evaporation of water, the iodine becomes sufficiently concentrated on the skin surface to coagulate the protoplasm of the skin cells and, when the solution is at all strong, results in blistering.

My improved crystalline iodine, described and claimed in my United States Patent 1,535,450, issued April 28, 1925, while actively soluble and suited for most purposes as a disinfectant and medicament, does not remain in suspension in water for a sufficient length of time to render it ideal for surgical purposes or as a disinfectant where greater strengths of iodine than the saturated aqueous solution are required.

The object of this invention is, by the process, to produce a permanent colloidal state of iodine which by virtue of the size and properties of the very small coloid-like particles, remains in suspension in water, whatever the strength of the suspension, for a practical length of time to render it very highly useful in surgery and medicine and as a disinfectant. Details of the process will appear from the description to follow.

I accomplish the results of my invention by a modification and development of the process described in my said United States Patent No. 1,535,450 for the production of crystalline iodine, under conditions of reduced temperature and in the presence of a protective colloid. The details of the process are as follows:

Commercial crystalline iodine is treated in a glass or earthenware container with a dilute solution of the hydroxide of an alkali or alkaline earth metal until all of the iodine is used up and a straw-colored liquid results. (The strength of the hydroxide depends on the nature of the hydroxide used. In the case of sodium hydroxide a one per cent. solution appears to be best.) This liquid appears to be a dilute solution of the metal iodohypoiodite, or a mixture of the metal iodide and the metal hypoiodite. Chemical tests indicate the presence of the hypoiodite. The probable reactions are indicated by the following equation:

$$I_2 + 2Na(OH) \rightarrow Na_2I(OI) \text{ or } NaI + Na(OI).$$

This straw-colored liquid is then immediately cooled to approximately 0° C. (by stirring broken ice or snow into the liquid or employing other means of cooling). A small amount of gum arabic (a few grams per pound of iodine) or other suitable protective colloid is then added to the liquid. This may vary from 10 grams up to an excess of the gum. The whole is then quickly acidified with a sufficient amount of hydrochloric acid or other strong acid to precipitate all of the iodine, the container being agitated during acidification. This process results in the production of a brick-red precipitate, or colloidal iodine, which is permanent. The probable reactions taking place are indicated by the following equation:

$$NaI + HCl \rightarrow HI + NaCl$$
$$NaOI + HCl \rightarrow H(OI) + NaCl$$
$$HI + H(OI) \rightarrow I_2 + H_2O$$

Any coarse crystalline iodine formed during this process may be separated from the colloid by passing the colloidal iodine through a paper filter. The sodium chloride formed during the process may be separated from the colloidal iodine by filtering through a Chamberland filter or by allowing the container (a tall one) to stand undisturbed for several days until the colloidal iodine is concentrated in the lower part of the container (the size of the particles, which is determined largely by the temperature at which the process is carried out, determines the rate of settling), and then siphoning off the sodium chloride solution. The small amount of iodine held in solution and in suspension by the sodium chloride may be recovered by the usual processes of iodine recovery. The colloidal-like iodine from which the sodium chloride has been siphoned may be diluted with water to any desired strength, the strength of the suspension being determined by direct titration with sodium thiosulphate.

Some permanent colloidal iodine, together with small ellipsoidal crystals, may be formed as the result of acidifying a mixture of solutions of iodides and iodates under conditions of reduced temperature and in the presence of a protective colloid, as gum arabic, or by employing a part of these modifications. For example: If a mixture of dilute solutions of sodium iodide (five parts) and sodium iodate (one part) is treated with gum arabic and then acidified with hydrochloric acid, the resulting precipitate, which has a violet tinge, is composed of a mixture of colloidal iodine and larger but still minute ellipsoidal crystals exhibting a Brownian movement when observed under the microscope.

My theory regarding the production of my colloidal iodine is as follows: In any rapid method of precipitating iodine from its solutions or its salts, there at first appears a brick red precipitate which is probably composed of colloidal iodine particles. This brick red precipitate is quite transient, being almost immediately superseded by a black precipitate of crystalline iodine. Observed under a high power microscope, or ultra-microscope, the colloidal particles which are first formed appear to pass into solution in any solvents of iodine present and from this solution are precipitated in the form of crystalline iodine.

For example: In the oxidation of hydriodic acid by hypohalous acids, a part of the hydriodic acid is immediately oxidized, yielding apparently a colloidal iodine. But the colloidal particles thus formed immediately pass into solution in the remaining hydriodic acid from which, on further oxidation, crystalline iodine is precipitated. If the process is sufficiently rapid, or the solution of the colloidal particles in the hydriodic acid slightly retarded, crystals having more truly the properties of crystalline iodine described in my United States Patent No. 1,535,450 appear to arise or form from still undissolved colloidal particles as nuclei. If the solution of the colloidal particles is retarded (as by working under conditions of reduced temperature and in the presence of a protective colloid) until after the complete oxidation of the hydrodic acid, they appear to remain permanent in the colloid-like state.

Some colloidal iodine particles may be produced by grinding iodine crystals and a small amount of gum arabic or other protective colloid, together in a mortar until the mass begins to fuse and then adding a small amount of water while continuing the grinding. An appreciable amount of colloidal iodine may be prepared by following this process, using a colloid mill instead of a mortar. Nothing results that can be appreciated in the absence of the protective colloid. This milling process is expensive and lacking in efficiency. It is possible, however, and large commercial units and organizations might make it commercial.

The colloidal iodine in suspension is brick red in color. When prepared with great care under perfect conditions, it is lighter in color and seems white in small amounts. Being in a colloid-like state, this form of iodine is very active. Free iodine is immediately available for most of the uses to which iodine is put, and the possible uses of iodine are thus extended. Furthermore, iodine in this form is comparatively non-irritating and may be applied to the human skin, raw cut surfaces and mucous surfaces freely without causing blistering. Moreover, that portion which is not rapidly absorbed by or combined with the tissues of the body or their secretions, when applied quickly volatilizes and does not leave a permanent stain, even clean cloth being not permanently stained or damaged by this colloidal iodine.

Having thus described my invention, what I claim as new and desire to secure by Letters Patent is:

1. The process of producing finely divided or colloidal iodine consisting in subjecting crystalline iodine to the action of one per cent. solution of sodium hydroxide until a straw-colored liquid results, cooling the straw-colored liquid, adding ten grams of gum arabic or other protective colloid for each pound of iodine, then adding rapidly strong hydrochloric acid to precipitate all the iodine in the form of a brick red precipitate filtering out the coarse crystals, allowing the filtrate to stand and concentrate, and drawing off the supernatant solution to remove the sodium chloride.

2. The process of producing finely divided or colloidal iodine consisting in subjecting crystalline iodine to the action of an alkaline hydroxide solution until dissolved, cooling the solution, adding a protective colloid, then adding rapidly to the solution strong acid to precipitate the colloidal iodine.

3. The process of producing iodine in finely divided particles or in colloidal form consisting in precipitating the iodine from solution at a low temperature in the presence of a protective colloid.

4. In a process for producing iodine suspensoid, the step which consists in rapidly precipitating iodine at approximately 0° C. in the presence of a protective colloid.

5. In a process for producing iodine suspensoid, the step which consists in rapidly precipitating iodine at approximately 0° C. in the presence of gum arabic.

6. In the process for producing iodine suspensoid, the step which consists in rapidly precipitating iodine with acid at approximately 0° C. in the presence of a protective colloid.

7. In a process for producing iodine suspensoid, the step which consists in rapidly precipitating iodine with acid at approximately 0° C. in the presence of gum arabic.

8. The process of producing iodine suspensoid consisting in dissolving iodine in a slight excess of a solution of alkaline hydroxide, adding a protective colloid, rapidly precipitating by mixing with a strong solution of mineral acid in sufficient quantity to precipitate all the iodine, and maintaining a reaction temperature of about 0° C. by the use of ice.

9. The process of producing iodine suspensoid consisting in dissolving iodine in a slight excess of a solution of alkaline hydroxide, adding a protective colloid, precipitating by mixing with a strong solution of mineral acid in sufficient quantity to precipitate all the iodine, and maintaining a reaction temperature of about 0° C.

10. Colloidal elementary iodine suspensoid in a stable form with gum arabic as a protective colloid.

11. As a new product, a substantially stable aqueous suspension of iodine, comprising iodine in a state of fine subdivision with a protective colloid formed by gum arabic.

In witness whereof I have hereunto set my hand.

WALLACE L. CHANDLER.